United States Patent

[11] 3,610,937

[72] Inventor James E. Dueker
St. Louis County, Mo.
[21] Appl. No. 806,018
[22] Filed Mar. 4, 1969
[45] Patented Oct. 5, 1971
[73] Assignee McDonnell Douglas Corporation
St. Louis, Mo.
Continuation-in-part of application Ser. No.
573,657, Aug. 19, 1966, now abandoned.

[54] DYNAMIC RANGE COMPRESSOR IMAGE AMPLIFIER
10 Claims, 5 Drawing Figs.
[52] U.S. Cl. .................................................. 250/213,
313/108
[51] Int. Cl. .................................................. H01l 17/00
[50] Field of Search ......................................... 250/213,
230, 211; 313/108, 108 A

[56] References Cited
UNITED STATES PATENTS
2,989,643  6/1961  Scanlon .................... 250/230
3,054,900  9/1962  Orthuber .................. 250/213
3,187,184  6/1965  Tomlinson ................ 250/213

OTHER REFERENCES
Tomlinson: Journal of the British Institute of Radio Engineers; Vol. 17; No. 3; March 1957 pp. 141–148
Hausmann-Slack: Physics Van Nostrand Co. Inc.; 4th Ed., Copyright 1957; page 418

Primary Examiner—Walter Stolwein
Attorney—Charles B. Haverstock

ABSTRACT: A photoconductor-electroluminescent light-responsive device capable of responding to incident input light illumination images over a wide range of image intensities without distorting or blurring the image being produced thereby on the output.

PATENTED OCT 5 1971 3,610,937

INVENTOR.
JAMES E. DUEKER
BY
*Charles B. Haverstock*
ATTORNEY

DYNAMIC RANGE COMPRESSOR IMAGE AMPLIFIER

This is a continuation-in-part of my earlier filed copending application Ser. No. 573,657, filed Aug. 19, 1966 now abandoned, and assigned to the same assignee.

The present invention relates generally to electro-optical devices and device particularly to light-sensitive devices including night sighting devices capable of operating effectively over a wide range of light conditions.

Attempts have been made in the past to devise night sighting means for line-of-sight operation, particularly for use under minimal light conditions such as under starlight conditions. There is need for such a device particularly as a means for reliably and accurately aiming field weapons and the like under almost total darkness conditions. All known and available night sighting devices sufficiently sensitive for use with starlight illumination cannot at the same time accommodate much of a range in brightness from one point to another in the field of view. On the other hand, all known night sighting devices that can accommodate a large range in brightness from one point to another in the field of view, are also relatively insensitive. Furthermore, all known devices, particularly of this second class require, among other things, a relatively intense source of light, or they require their own source of light or other energy. For these and other reasons all known and available night sighting devices are unsatisfactory. The known devices are also relatively expensive and are too complicated and cumbersome for field use, they have relatively limited scope and range, the intensity and other characteristics of their light source are relativity critical, and they have the further disadvantage that the energy or light rays they employ can also be used as a target by an enemy. For these and other reasons, known night sighting devices have enjoyed relatively limited use or have not been used at all.

The present invention teaches the construction and operation of novel dynamic range compressor means for use with night sights and other devices, which means enable such devices to overcome these and other disadvantages and shortcomings. The subject means are capable of operating over a wide range of light conditions including minimal lighting conditions such as starlight reflected by remote objects or targets as well as relatively intense light conditions. Furthermore, the subject means are able to respond to such reflections and produce visible images of a field of view so that an operator using a night sight constructed according to the present invention can distinguish remote objects and accurately sight on a particular target. When the subject means are being used under such minimal light conditions, they may, from time to time, be exposed to more intense light conditions. At such times it is important that the operator not lose sight of the target due to blooming of the image on the light-sensitive means. This is possible using the subject means because of the dynamic range compressor characteristics which are built into it. The means for accomplishing this include a specially constructed multilayer light-sensitive element having dynamic light range compression characteristics which prevent undesirable blooming of images due to changes in the intensity of the incident light impinging thereon.

In one embodiment, the present invention comprises means for sighting on targets and other objects under nighttime conditions, as for example, when the only continuous source of incident light is the starlight reflected by remote objects. This embodiment includes a multilayer light-sensitive element and optical means for exposing said element to the incident starlight reflections from a remote field of view, said light-sensitive element including a photoconductive layer positioned to be exposed to the incident reflection, a layer of optically opaque dielectric material adjacent to the photoconductive layer in the element, a layer of electroluminescent material on the opposite side of the opaque layer, means for establishing a voltage between opposite sides of the photoconductive and electroluminescent layers, means for amplifying the responses produced by the element to produce visible images of the field of view and optical means for observing the amplified image responses produced on the electroluminescent layer.

A principal object of the present invention is to provide night sighting means capable of operating on minute amounts of light such as reflected starlight.

Another object is to provide a light-sensitive element constructed to resist image blooming when subjected to widely varying light intensities.

Another object is to provide a night sight device which does not require its own source of radiation energy.

Another object is to provide a line-of-sight night sighting device which has a substantial range.

Another object is to provide a light-sensitive element capable of maintaining a substantially linear relationship between output image brightness as a function of input image brightness particularly at relatively low light intensities.

Another object is to provide means to control blooming in solid-state light-sensitive devices including devices having electroluminescent and photoconductive materials.

Another object is to control image blooming in light-sensitive devices through the use of optical isolation layers and/or pattern deposition of the layers of such devices.

Another object is to control or prevent blooming in light-sensitive devices such as light amplifiers by means which substantially restrict the dynamic range of light levels to be amplified.

These and other objects and advantages of the present invention will become apparent after considering the following detailed specification which covers a preferred embodiment of the subject device in conjunction with the accompanying drawings, wherein.

Figure 1:
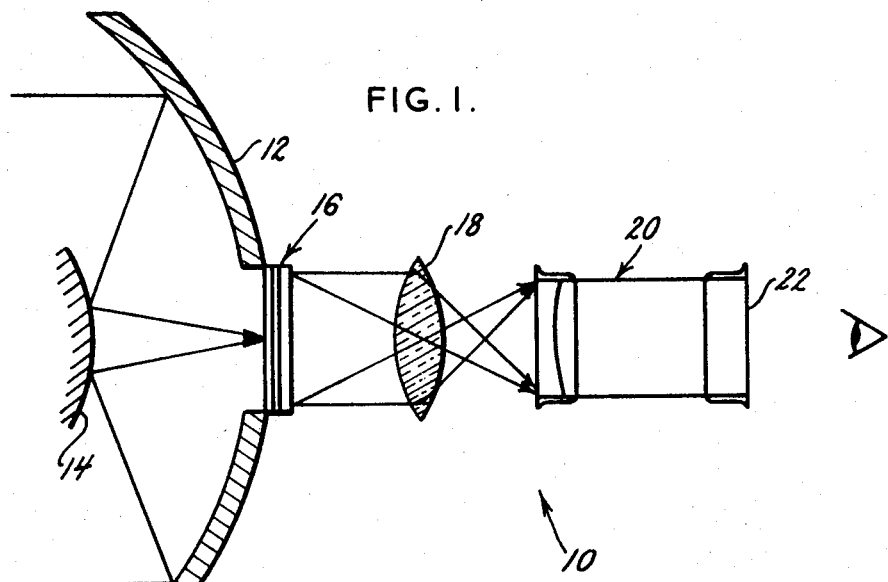
FIG. 1 is a schematic view of a night sighting device constructed according to the present invention.

Referring to the drawings more particularly by reference numbers, number 10 refers generally to a night sighting device constructed according to the present invention. The device 10 includes a primary objective mirror 12 which faces toward an observation field or target area to be observed, and a secondary mirror 14 which receives incident image light reflected by the mirror 12 and reflects it in the directions shown by the arrows. The device 10 also includes a light-sensitive element 16 which will be referred to as a dynamic range compressor because of its peculiar operating characteristics. The structural details of the element 16 are shown in FIG. 2.

The incident light impinging on the element 16 from the mirror 14 produces an image of the observed field of view which can be amplified and viewed by an observer. The means by which the image produced on the element 16 can be viewed include a transfer lens 18, an image intensifier device 20, and an eyepiece 22. The optical means may also include crosshairs for aiming purposes if the device is to be used for aiming a weapon.

Of particular importance to the present invention is the construction and operation of the semiconductor elements 16 which acts as a dynamic range compressor. The term dynamic range compressor refers to the ability of the element 16 to respond to incident light of widely varying intensities without producing objectionable blooming of the image which is a condition that causes the image to expand and become blurred and indistinct as the intensity of the incident light increases. This occurs because at the more intense incident light conditions the light-sensitive element becomes overexcited. This objectionable condition occurs in all known light amplifiers employing photocathodes and existing light-sensitive elements that include photoconductive and/or electroluminescent layers. The present element construction overcomes the objectionable blooming condition and at the same time is able to respond to an extremely wide range of light intensities including the minute amounts of light such as are produced by starlight after it has been reflected from remote objects. Furthermore, the subject element construction prevents an operator from losing sight of an object due to momentary changes in the intensity of the incident light.

Figure 2:
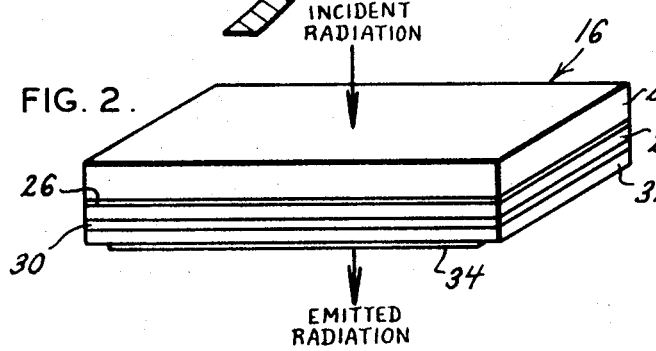
FIG. 2 is an enlarged perspective view showing the details of a photoconductive-electroluminescent solid-state dynamic range compressor for use in the device of FIG. 1.

FIG. 2 shows the structural details of one embodiment of the light sensitive range compressor element 16. The element 16 includes a glass or other transparent substrate layer 24 on which is applied a layer 26 of a highly transparent material such as stannous oxide. The layer 26 is also electrically conductive and is sometimes referred to as a Nesa layer. The layer 26 is used as one electrode of the element 16. There are other transparent conductive materials that can also be used for the layer 26 and it is not intended to restrict the construction of the layer 26 to a particular substance.

A photoconductive (PC) layer 28 is applied or attached to the layer 26 and the opposite surface of the layer 28 from the layer 26 has a layer of optically opaque dielectric material 30 attached thereto, as shown. In like manner, the other surface of the dielectric layer 30 is attached to a layer 32 of electroluminescent-phosphor (EL) material or the like. The opposite surface of the electroluminescent layer 32 has a transparent conductive layer 34 of a material such as gold applied thereto, and the layers 26 and 34 are connected across a source of electric potential.

The element 16 is mounted in the position shown in FIG. 1 when used in a sighting device with the transparent substrate or glass layer 24 on the side that faces the incident light from the field of view. The selection of materials from which the layers of the element 16 are constructed is important to the operation and response characteristics of the device. There are many known materials which can be used for the different layers of the elements 16, and it is not intended in this specification to limit or restrict the construction of any layer to a particular material or substance because the operating characteristics will vary depending on the materials selected. This is especially so of the PC and EL layers.

The selection of the materials for the photoconductive layer 28 is particularly important whether the device is to be used as an image amplifier or for dynamic range compression. For example, the selection of the photoconductive layer material in large measure determines the minimum light intensity or level to which the device will respond and the speed of response as well as the spectral range over which the device will operate. The speed and sensitivity interdependence are better understood by considering the gain equation for a photoconductive material which is written:

$$G = BV\mu/d^2(LANC)^{1/2}$$

where:

$G$ is the gain of a photoconductor defined as the ratio of the number of charge carriers in the photocurrent to the number of photons absorbed.

$\mu$ is the charge carrier mobility, $v$ is the voltage applied across the two electrodes separated by $d$ the distance, of separation.

$L$ is the number of photons absorbed per unit volume per unit time, $A$ is proportional to the recombination rage of free electrons and holes, $B$ is proportional to $e^{E_{ion}/kT}$ where $E_{ion}$ is the ionization energy of traps, $D$ is a constant related to the recombination of electrons with trapped holes, and $N$ is the number of trapping levels per unit volume.

The only parameters in the above equation which are independent of the photoconductive material itself and hence which can be selected are the applied voltage $V$ and the distance of conduction $d$ between the conductor layers 26 and 34. All of the other terms are controlled by the selection of the particular photoconductive material for the layer 28. It is to be noted, however, that the gain $G$ cannot be increased without limit by increasing the value of the electric field term "$V/d$" because of possibility of breakdown. Some compromise must therefore be reached.

The output brightness produced on the electroluminescent layer is a function of the voltage applied thereacross and the brightness varies in such a way that the relationship between the applied voltage and the output brightness is a direct proportional relationship. Also the maximum output brightness obtainable from the electroluminescent layer such as the layer 32 is limited by the dielectric strength of the layer, the dielectric strength being the electric field intensity which will cause an electrical breakdown of the layer. In this regard, it is important to note that the electroluminescent layer in the present device will never saturate but will breakdown if the electric field thereacross which depends on the applied voltage is made too strong so that arcing and accompanying breakdown occurs resulting in destruction of the electroluminescent layer. If this occurs then the electroluminescent layer as well as the entire device would become useless.

The photoconducting layer 28 on the other hand, is constructed of materials which are intrinsically photoconductors and as such involve charge carrier transitions between their valence and their conduction bands. This type of photoconduction does not saturate with high intensity light, and in fact the population in the valence band of the photoconductive layer is so high that it never saturates. Impurity photoconduction on the other hand which occurs when the impurities in the photoconducting layer produce available charge carriers at energy levels that are between the valence band and the conduction band will saturate but usually not until about 5 to 7 decades of brightness increase has occurred. This fact is made use of in the present device. In other words, in the present device the photoconducting layer will saturate when an impurity photoconduction layer is used but the electroluminescent layer will never saturate if the voltage applied thereacross is never permitted to become so large as to cause arcing.

The total present dynamic range compressor device which includes both electroluminescent and photoconducting layers saturates after 2 or 3 decades of increase in the level of the input brightness. The saturation of the total device which occurs, however, is not a result of saturation of the photoconducting layer for the reasons stated above, nor is it a result of saturation of the electroluminescent layer which never saturates. In this regard it should be noted also that the photoconductive layer employed in the present device is constructed of a material that is capable of responding to the input light intensity even after the input light intensity is sufficient to cause the total device to saturate, that is even after the input brightness has increased 2 or 3 decades. How the saturation of the output occurs in the subject device is explained below, but at this point it is only important to recognize that it is not produced by saturation of the electroluminescent layer, since as stated above the electroluminescent layer never saturates unless of course it breaks down and becomes useless due to arcing caused by an excessive high voltage being applied thereacross.

Laboratory measurements made on devices constructed according to the subject dynamic range compressor have demonstrated that the photoconducting and the electroluminescent layers can be treated effectively as though they were high-leakage capacitors connected in series each effectively having as variable impedance or resistance connected across it. The impedance of the variable impedance across the capacitors of the two layers will vary in a particular relationship as will be indicated in accordance with the intensity of the light impinging on the device. For example, when the subject device saturates as the input light level increases, the impedance or equivalent impedance of the photoconductive layer will decrease absolutely and also in relation to the impedance of the electroluminescent layer. This decrease in the impedance of the photoconducting layer causes less of the total applied voltage to appear across the photoconductive layer and more of the applied voltage to be applied across the electroluminescent-phosphor layer with an attending increase in the output brightness. When the impedance of the photoconducting layer has become relatively small compared with the impedance of the electroluminescent layer no appreciable further change in the voltage across the electroluminescent layer can occur since most of the applied voltage at this point will already be across the electroluminescent layer. This condition will occur even though the photoconductive layer has not saturated and even though the electroluminescent layer has not reached its breakdown point. It is this face namely that the voltage across the electroluminescent-phosphor layer can no longer change appreciably even though the input light intensity should increase substantially which is the reason for the occurrence of the output saturation that takes place in the subject device. This means of course that it is necessary to select an applied voltage that will not cause breakdown of the electroluminescent layer. This is a simple matter. Another way of looking at these same changes that occur in the present device is to consider that as the intensity of the input light increases, the impedance characteristics of the electroluminescent-phosphor and photoconducting layer change in such a way that they cause an increase in the proportion of the applied voltage across the device to be applied across the electroluminescent layer and a decrease in the proportion of the applied voltage to be applied across the photoconducting layer.

In an actual device constructed according to the present invention the ratio of the capacitance of the electroluminescent layer to the capacitance of the photoconductive layer should be selected to be initially in a range of from approximately 20 to 1 to approximately 100 to 1. An average value for this ratio will be about 50 to 1. It is noteworthy in this regard that the capacitance of the photoconductor layer will decrease with increases in the input light level while the capacitance of the electroluminescent phosphor layer will decrease with increased voltage applied across it.

The problem of blooming which is discussed throughout this specification in large measure is prevented or overcome by also making the layers in the subject device relatively thin. Also when the subject dynamic range compressor is positioned adjacent to an image amplifier device or other output stage, the image amplifier is prevented from blooming because of the restricted range of light levels which the dynamic range compressor emits for the reasons stated above. Electrical breakdown of the dynamic range compressor is also in part prevented or largely overcome by the addition of the layer 30 of high dielectric constant material which is positioned between the photoconducting and the electroluminescent-phosphor layers.

Figure 4:
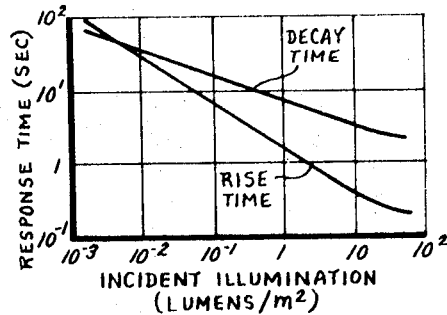
FIG. 4 is a graph of response time in seconds as a function of incident illumination in lumens per square meter; and, FIG. 5 is a graph of emitted brightness in lumens per square meter plotted against image diameter in centimeters.

Two materials which have been tested for use in the photoconductive layer are cadmium sulfide (CdS) and cadmium selenide (CdSe). Both of these materials show a high degree of photosensitivity in the spectral range from about 0.7 to 1.0 microns. However, CdS has a lower response speed than CdSe. FIG. 4 shows the effective response time of a typical PC-EL light amplifier as a function of incident illumination. Many other photoconductive materials can also be used for some applications including aluminum arsenide (AlAs) and others. The selection will depend on the desired spectral response, sensitivity, speed of response and other characteristics.

Figure 3:
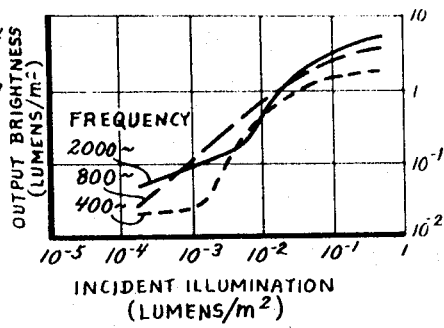
FIG. 3 is a graph of output brightness in lumens per square meter plotted against incident illumination in lumens per square meter.

The graph in FIG. 3 shows the output brightness produced by an element illuminated at relatively low levels of visible light and operating as a dynamic range compressor. In the graph both the output brightness and the incident illumination are in lumens per square meter. The three lines of the graph of FIG. 3 are for different light frequencies using the same voltage applied between the conductor layers 26 and 34. Note the relatively linear relationship that exists between the intensity of the incident illumination and the intensity of the output brightness over the selected range of inputs. In the graph the linear relationship is shown to exist over a range of more than 2 decades of input light levels before saturation begins to take place. This is an important relationship because it demonstrates that the subject device is able to receive and respond to a relatively wide range of incident light intensities and this is done in the subject device without producing undesirable blooming of the image. The selection of a photoconducting material is therefore very important to the operation of the subject device and also determines the minimum light level and the light level range to which the system is responsive. As already noted the particular photoconductive material also determines the speed of response, the spectral range and other characteristics of the system in which the device is used.

Figure 5:
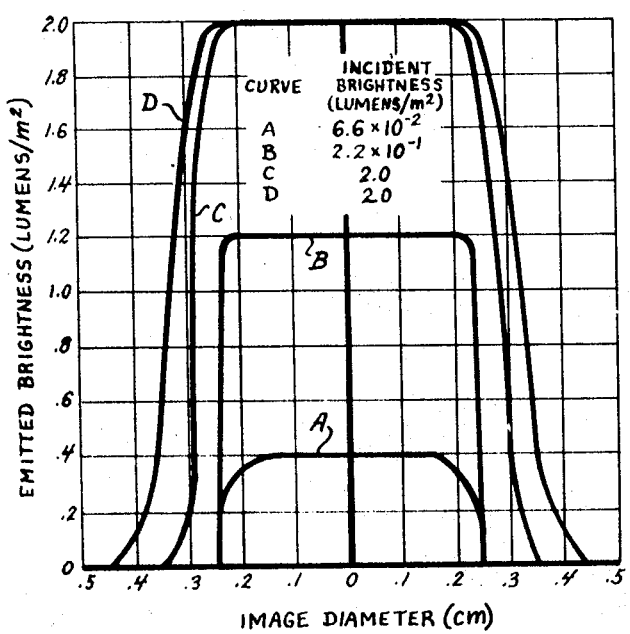

The fact that the photoconductive layers continue to respond to incident light even when the incident light intensity is sufficiently high to have caused saturation of output brightness is one of the properties of the subject device which is particularly desirable and enables it to perform as a dynamic range compressor. This is apparent in FIG. 3 which shows that no significant increase in the output occurs when the input increases above the level of about $10^{11}$ lumens per square meter. Furthermore, no detrimental blooming takes place at or near the point of highest brightness in the image scene as shown by the graph in FIG. 5 which illustrates how the measured profile of the output image of a circular spot of incident light focused into a 5-millimeter diameter on the output face of an image amplifier varies with changes in the intensity of the incidental lumination of the spot. The particular curves shown on the graph of FIG. 5 were made from data obtained using an element such as the element 16 having a uniform layer of photoconductive material formed of cadmium selenide (CdSe) and an electroluminescent-phosphor layer formed of zinc sulfide and copper (ZnS:Cu). During the tests no precautions were taken to reduce the tendency for the bright point image impinging on the element to bloom. As seen from the graph, an illumination level of approximately one order of magnitude greater than anticipated was used with no troublesome degree of blooming. Furthermore, the blooming can be minimized for even higher incident illumination levels to the extent that the pattern of deposition of the photoconductor and electroluminescent-phosphor layers can be utilized without adversely influencing the resolution. Thus, the graph shown in FIG. 5 clearly illustrates that by properly selecting the materials for the photoconductive and electroluminescent-phosphor layers, dynamic range compression can be obtained which will enable a night sighting device or other similar instrument to be operated over a wide range of incident illumination without distorting the image due to undesirable blooming or causing the operator to lose his ability to view the target. As already stated, there are many materials that can be used for the layers of the element 16 depending on the characteristics desired. Care must be taken, however, to select materials which will satisfy the particular range requirements that are desired and expected. The selected materials will also have an effect on the speed and sensitivity characteristics.

Particular materials which have demonstrated desirable characteristics for the photoconductive layer of the subject device include CdS and CdSe. The Cds generally has a lower response speed than CdSe but both have similar photosensitivity characteristics. Both of these materials also show a high degree of photosensitivity in the spectral range from about 0.7 to 1.0 microns which makes them particularly useful in a night sight. Relatively few materials, however, possess band gaps in the desired visible range and at the same time have relatively high mobility characteristics. Aluminum arsenide (AlAs) also appears to be a particularly good choice for the photoconducting material because it has a relatively high probability of absorption for incident photons and a high mobility for charge carriers generated during this absorption process. The high charge carrier mobility is a necessary characteristic for a substance to have a fast response time and aluminum arsenide is a promising material from both of these standpoints. The band gap for aluminum arsenide is also such that its response to near infrared wavelengths is minimized thereby providing means for selectively looking at a starlight scene without effectively seeing near-infrared beacons. Other materials can also be used but care must be taken in their selection. These include in addition to Cds, CdSe and AlAs, substances such as InSb, InAs, HgTe, GhSe, GaAs, GaSb, Ga, InP, IR, AlP, Si, CdTe, ZnSe, AlSb, ZnS, GaP, SiC, and others.

Various techniques have been developed for constructing continuous layers of photoconducting material and also continuous layers of electroluminescent phosphor. These techniques produce a solid-state light amplification system which can be operated as a dynamic range compressor over as much as 5 or more decades of input brightness with very little blooming. It is anticipated that even larger dynamic ranges can also be accommodated without serious blooming as the above and other materials are explored. It is therefore possible using the teachings of the present invention to construct devices capable of responding to widely varying ranges of light intensities without breaking down or becoming overexcited and blooming. It is also possible using the present invention to construct devices capable of sensing extremely minute amounts of light such as starlight reflected by remote objects. Needless to say that the principles of the present invention can also be used to sense much larger light intensities, and it is not intended to limit the invention to use with a night sighting device.

Thus there has been shown and described novel dynamic range compressor means capable of responding to widely varying light intensities without breaking down or producing undesirable blooming, which means fulfill all of the objects and advantages sought therefor. Many changes, modifications, variations, and other uses and applications of the subject device will, however, become apparent to those skilled in the art after considering this specification and the accompanying drawings. All such changes, modifications, variations, and other uses and applications which do not depart from the spirit and scope of the invention are deemed to be covered by the invention which is limited only by the claims which follow.

What is claimed is:

1. A dynamic range compressor comprising a semiconductor element including impedance matched layers of photoconductive and electroluminescent-phosphor materials, a layer of optically opaque dielectric material positioned between the said photoconductive and electroluminescent-phosphor layers, means establishing a voltage through the semiconductor element which is less than the breakdown voltage of the electroluminescent-phosphor layer by itself, means exposing the photoconductive layer to incident light radiations from a remote source, said photoconductive layer being constructed of a material having relatively high quantum efficiency and said element having relatively stable output saturation characteristics to produce an output brightness in the electroluminescent-phosphor layer which varies substantially linearly with the intensity of the incident light radiation impinging thereon over a relatively low range of incident light intensities, said photoconductive and electroluminescent-phosphor layers being constructed to have an equivalent capacitance relationship when the compressor is not exposed to incident light in a relationship of from about 1 to 20 to about 1 to 100, said relationship changing so that the impedance of the electroluminescent-phosphor layer increases in relation to the impedance of the photoconductive layer as the intensity of the incident light increases whereby an increasing portion of the voltage established through the element is across the electroluminescent-phosphor layer, the effect of the increased voltage across the electroluminescent-phosphor layer causing the brightness of the image produced thereon to reach a maximum brightness that depends on the voltage applied through the element thereby limiting the maximum brightness obtained in said electroluminescent-phosphor layer and compressing the range of brightness of the output for increases in intensity of said incident light even in the range of incident light intensities which are high enough to cause substantially all of the applied voltage to be across the electroluminescent-phosphor layer, said photoconductive layer being constructed of a material capable of responding to incident light intensity even after the incident light intensity is sufficient to cause the brightness of the image in the electroluminescent-phosphor layer to reach the maximum condition.

2. The dynamic range compressor defined in claim 1 including a transparent electrical conducting layer mounted on opposite surfaces of the photoconductive and electroluminescent-phosphor layers forming opposite sides of the element, and a source of voltage connected between said electrical conducting layers, the voltage of said source being less than the breakdown voltage of the electroluminescent-phosphor layer.

3. The dynamic range compressor defined in claim 1 wherein said photoconductive layer is formed of cadmium sulfide.

4. The dynamic range compressor defined in claim 1 wherein said photoconductive layer is formed of cadmium selenide.

5. The dynamic range compressor defined in claim 1 wherein said photoconductive layer is formed of aluminum arsenide.

6. The dynamic range compressor defined in claim 1 wherein said electroluminescent-phosphor layer is formed of a combination of zinc sulfide and copper.

7. The dynamic range compressor defined in claim 1 wherein said photoconductive layer is formed of a material having a charge mobility characteristic in square centimeters per volt-second in the range from $10^2$ to $10^5$ and a band gap energy ranging from less than 0.5 electron volts to more than 3 electron volts.

8. A night sight for use under minimum nighttime conditions such as under starlight comprising a light-gathering mirror positioned to face in the direction of a field of view, said mirror being constructed to concentrate incident light impinging thereon from the field of view, a light-sensitive element positioned to be exposed to the concentrated incident light, said light-sensitive element positioned to be exposed to the concentrated incident light, said light-sensitive element including a multilayer semiconductor wafer element formed of layers of materials including a layer of photoconductive materials for exposing to the incident light, a layer of controlled opacity positioned adjacent to the photoconductive layer, and an electroluminescent layer on the opposite side of the opaque layer from the photoconductive layer for reproducing an image of the field of view, means to establishing a predetermined voltage across the element that is less then the breakdown voltage of the electroluminescent layer by itself, said means including a voltage source and a pair of light transparent electrically conductive layers attached to opposite sides of the element respectively in contact with the photoconductive and the electroluminescent layers, said photoconductive and electroluminescent layers being impedance matched so that the equivalent capacitance of the electroluminescent layer to the equivalent capacitance of the photoconductive layer when the wafer element is not exposed to incident light is in a range from about 20 to 1 to about 100 to 1, the electroluminescent layer being constructed of a material whose capacitive reactance increases with increases in the voltage applied thereacross, the photoconductive layer being constructed of a material whose effective impedance decreases with increases in the intensity of the incident light impinging thereon, the relationship of the total impedance characteristics of said electroluminescent and photoconductive layers changing with increases in light intensity reaching a condition at a predetermined incident light intensity where substantially all of the voltage applied across the element is across the electroluminescent layer, said photoconductive layer being constructed of a light-sensitive material that continues to respond to incident light intensity even when the incident light intensity is sufficient to have caused a substantially maximum brightness of the electroluminescent layer, and means positioned to observe the reproduced image on the electroluminescent layer.

9. The night sight defined in claim 8 wherein said photoconductive layer is constructed of material having a relatively high quantum efficiency and output saturation such that the brightness of the image reproduced on the electroluminescent layer varies substantially linearly with the intensity of the incident light impinging on the photoconductive layer over a range of relatively low incident light intensities, and wherein the output brightness of the element saturates adjacent to the upper end of said range and does not substantially increase in intensity with further increases in the brightness of the incident light.

10. The night sight defined in claim 8 wherein said incident-light-concentrating means includes a concave mirror positioned to face in the direction of the field of view and a convex mirror positioned in the path of the concentrated incident light reflected by the concave mirror to reflect said light onto the photoconductive layer of the semiconductor element.

UNITED STATES PATENT OFFICE
CERTIFICATE OF CORRECTION

Patent No. 3,610,937      Dated October 5, 1971

Inventor(s) James E. Dueker

It is certified that error appears in the above-identified patent and that said Letters Patent are hereby corrected as shown below:

Column 1, line 6, "device " should be "more".

Column 4, line 65, "impedance" (second occurrence) should be "impedances".

Column 5, line 13, "face" should be "fact".

Column 6, line 21, "$10^{11}$" should be "$10^{-1}$".

Column 8, line 40, cancel "said light-sensitive element positioned to be exposed to the"; line 41, cancel "concentrated incident light,".

Signed and sealed this 18th day of April 1972.

(SEAL)
Attest:

EDWARD M. FLETCHER, JR.       ROBERT GOTTSCHALK
Attesting Officer      Commissioner of Patents